United States Patent [19]

Applegren

[11] Patent Number: 4,754,027

[45] Date of Patent: Jun. 28, 1988

[54] PROCESS FOR PREPARING A PRODUCT COMPRISING GUAR-GUM

[75] Inventor: Curt H. Applegren, Kungsbacka, Sweden

[73] Assignee: Lejus Medical Aktiebolag, Molndal, Sweden

[21] Appl. No.: 877,007

[22] Filed: Jun. 20, 1986

[30] Foreign Application Priority Data

Jun. 20, 1985 [SE] Sweden .......................... 8503092

[51] Int. Cl.$^4$ .................... C08B 37/00; A61K 31/715
[52] U.S. Cl. .......................... 536/114; 514/54; 424/490; 424/493; 424/495; 424/494; 424/496; 424/497
[58] Field of Search ............... 536/114; 424/489, 490, 424/493, 494, 495, 496, 497, 498; 514/54

[56] References Cited

U.S. PATENT DOCUMENTS

| | | | |
|---|---|---|---|
| 2,196,768 | 4/1940 | Hiatt | 424/495 |
| 3,326,890 | 6/1967 | Engelskirchen et al. | 536/114 |
| 3,679,658 | 7/1972 | Yueh et al. | 536/114 |
| 3,912,713 | 10/1975 | Boonstra et al. | 536/114 |
| 4,011,393 | 3/1977 | Trapasso | 536/114 |
| 4,031,306 | 6/1977 | DeMartino et al. | 536/114 |
| 4,043,952 | 8/1977 | Ganslaw et al. | 536/114 |
| 4,299,825 | 11/1981 | Lee | 536/114 |
| 4,309,535 | 1/1982 | Majewicz | 536/114 |
| 4,315,918 | 2/1982 | Gayst et al. | 536/114 |
| 4,341,759 | 7/1982 | Bogentoft et al. | 424/489 |
| 4,443,497 | 4/1984 | Samejima et al. | 424/495 |
| 4,562,061 | 12/1985 | Appelgren et al. | 424/497 |
| 4,606,940 | 8/1986 | Frank et al. | 424/495 |
| 4,608,278 | 8/1986 | Frank et al. | 424/497 |
| 4,656,027 | 4/1987 | Sjöovist | 424/497 |
| 4,666,705 | 5/1987 | DeCrosta et al. | 424/482 |
| 4,675,312 | 6/1987 | Nittner et al. | 514/54 |
| 4,701,341 | 10/1987 | Appelgren | 427/3 |

FOREIGN PATENT DOCUMENTS 47-18622  5/1972  Japan .................................. 424/495

*Primary Examiner*—Ronald W. Griffin
*Attorney, Agent, or Firm*—Burns, Doane, Swecker & Mathis

[57] ABSTRACT

The present invention relates to a process for preparing a product comprising guar-gum present in the form of particles, and possessing a sustained swelling in an aqueous suspension, whereby pulverulent guar-gum flour is provided with a solution consisting of water:solvent in the relationship 60:40 to 0:100, and comprising a compound of the group consisting of film forming fatty acids, film forming polymers, and ethyl cellulose, and whereby the solvent is an organic solvent having ability in dissolving said organic film forming compounds, while creating a particle agglomerate having a size of less than 3 mm, but substantially above 0.5 mm.

13 Claims, No Drawings

PROCESS FOR PREPARING A PRODUCT COMPRISING GUAR-GUM

DESCRIPTION

1. Technical Field

The present invention relates to a process for preparing a product comprising guar-gum in the form of particles having a sustained swelling in an aqueous suspension thereof.

The object of the present invention is to obtain a process by means of which guar-gum in the form of particles are obtained, which have a sustained swelling in an aqueous suspension thereof, in order to provide a safe administration by means of a drinkable, low viscosity suspension.

2. Background of the Invention

It is previously known to administer guar-gum to humans for several different purposes. Thus guar-gum, which swells in an aqueous suspension, can be used as an agent for overweight persons by reducing the feeling of hunger, which is provoked when they are on a low caloric diet, and can thus act as a weight reducing agent. One side effect of a low caloric diet is very often constipation, as occurs with all bulk-free products. Guar-gum thereby has, as all bulk fiber products, a positive impact on the prevention of constipation. It has also been shown that guar-gum has a positive impact on the lowering of blood cholesterol, so called LDLC, low density lipid cholesterol, i.e., the so called bad cholesterol without thereby changing HDLC-high density lipid cholesterol.

The term guar-gum means above, and in the following the preground endospermium of grains of the guar plant, *Cyanopsis tetragonslobus, L. taub.* (fam. Leguminosae). This is a white-yellow white, almost odorless powder. Chemically it is a hydrocolloid polysaccharide, galactomannan, with a high molecular weight. It is related to galactopyranose comprising mannopyranose units bound via glucosidic linkages, 75% being galatomannan.

Further, it has turned out that guar-gum has an impact on the glucose in the intestinal tract, which delays its absorption into the blood circulation system, meaning that persons suffering from diabetes, preferably may have guar-gum, and thereby lower the sugar load.

In order to be able to administer guar-gum it is necessary that the product does not swell and gel as fast as ordinary guar-flour, as this may lead to undesired side effects in the form of stopping plugs in the esophagus, or in the gastrointestinal tract, or one may obtain a unpalatable, jelly product, which most people regard as difficult to administer—to drink.

DESCRIPTION OF THE PRESENT INVENTION

It has now surprisingly been shown possible to be able to solve this problem, and to obtain an effectively acting product by means of the present invention, which is characterized in that powderous guar-gum is provided with a solution consisting of water:solvent in a relationship of 60:40–0:100, and comprising a compound from the group consisting of film forming substances of fatty acids, film forming polymers, and ethyl cellulose, and whereby the solvent is an organic solvent with the ability of dissolving said organic film forming compounds, while creating particle aggregates having a size below 3 mm, but substantially above 0.5 mm.

Further characteristics are evident from the accompanying claims.

The term film forming fatty acids means fatty acids having 14–20 carbon atoms, preferably stearic acid, and palmitic acid.

The term film forming polymer relates to anionic, cationic, and nonionic polymers such as cellulose acetate phthalate, polyvinyl acetate phthalate, hydroxypropyl methylcellulose acetate phthalate, shellac, zein, methacrylic acid-methacrylic acid methylester copolymer (Eudragite® L,S), acrylic acid-methacrylic acid esters (Eudragite® RS,RL), dimethyl amino ethyl methacrylate-neutral methacrylic acid esters copolymers (Eudragite® E).

The term organic solvent above relates to a solvent which dissolves said organic film forming agents, and which solvents are normally used within the foodstuff and the pharmaceutical industries. Such solvents are lower alkanols having 1–4 carbon atoms, such as ethanol, isopropanol, lower ketones, such as acetone, methylethyl ketone, chlorinated hydrocarbons, such as methylchloride, lower aromatic compounds having 6–8 carbon atoms such as benzene, xylene, toluene. The powderous starting material has suitably a particle size of less than 100 mesh (150μm), preferably less than 150 mesh (100μm).

The particle agglomeration—the granulation—is preferably carried out in an intensive mixer, or preferably in a continous mixer (NICASYSTEM MIXER), whereby the powderous guar-gum product is provided with said solution in an amount of 300–800 ml per kg guar-gum flour. The solution contains normally 2–30% by weight of said organic film forming agent, more typically 6–9 % by weight.

The process provides the powderous guar-gum particles with a coating of said organic substance during simultaneous agglomeration—granulation. Then the product is dried, preferably in a fluidized bed, or heating cabinet on trays.

This agglomeration—granulation—according to the present process gives a final product, 100%<3 mm, <5%<0.5 mm, which has a jelling time of >5 min but <30 min typically 10–15 min in a standardized test, 10 g of guar-gum product in 150 ml H$_2$O at 20° C. (6.25 % solution).

It has also turned out that the product of the present process possesses less side effects than known guar-gum products by causing a lower frequency of flatulence and diarrhea.

In spite of the treatment in accordance with the present invention a good inhibition of glucose, and a reduction of low density lipid cholesterol (LDLC) are obtained.

EXAMPLE 1

98.2 kg of guar-gum flour, particles size <100 μm, were provided with a solution consisting of water: isopropanol (azeotropic mixture 12:88) in an amount of 28.5 kg, wherein 9.18 kg of ethyl cellulose of the quality N7-N50 were dissolved. The guar flour was moistened in a wet mixer (NICASYSTEM MIXER) momentarily, and dried to a residual H$_2$O content of <8% by weight in a fluidized bed drier for 30 min, whereupon the right fraction was sieved off, 0.5<a<3 mm.

EXAMPLE 2

Example 1 was repeated with the difference that shellac was used as a film forming agent, and the solvent consisted of ethanol:acetone (50:50, 13 kg of each).

EXAMPLE 3

Example 1 was repeated with the difference that cellulose acetate phthalate was used as film forming agent, and the solvent consisted of ethanol:acetone (50:50, 13 kg of each).

EXAMPLE 4

Example 1 was repeated with the difference that the film forming agent consisted of a cationic film former, Eudragite® E, i.e. a polymer of dimethyl amino ethyl-methacrylate-neutral methacrylic acid esters, and the solvent consisted of acetone:isopropanol (40:60).

EXAMPLE 5

Example 1 was repeated with the difference that the film forming agent consisted of a nonionic film former, Eudragite® RS, i.e. an acrylic acid-methacrylic acid ester copolymer, and that the solvent consisted of methylene chloride:isopropanol (40:60).

All products above had a jelling time of about 15 min in the above given standardized test.

I claim:

1. A process for preparing a particulate product which is swellable in an aqueous suspension comprising:
   (a) mixing powdered guar-gum flour with a solution composed of water, a compound from the group consisting of ethyl cellulose, cellulose acetate phthalate, copolymer of dimethyl amino ethylmethacrylate-neutral methacrylic acid esters and copolymer of acrylic acid-methacrylic acid esters, and a solvent for the compound wherein the ratio of water to solvent is in the range of from 60:40 to 0.100 and the compound is present in an amount of 2–30% by weight of the solution so as to form agglomerated particles of the guar-gum flour;
   (b) drying the agglomerated particles; and
   (c) recovering a guar-gum particulate product having a particle size in the range of from 0.5 to 3 millimeters.

2. The process of claim 1 wherein the solvent is selected from the group consisting of alcohols having from 1 to 4 carbon atoms, lower ketones, chlorinated lower hydrocarbons, aromatic compounds having 6 to 8 carbon atoms and mixtures thereof.

3. The process of claim 2 wherein the solvent is selected from the group consisting of methanol, ethanol, isopropanol, n-propanol, tert-butanol and mixtures thereof.

4. The process of claim 2 wherein the solvent is selected from the group consisting of methyl ethyl ketone, acetone and mixtures thereof.

5. The process of claim 2 wherein the solvent is methylene chloride.

6. The process of claim 2 wherein the solvent is selected from the group consisting of benzene, toluene, xylene and mixtures thereof.

7. The process of claim 1 wherein the solvent is a combination of ethanol and acetone or isopropanol and acetone.

8. The process of claim 1 wherein the solvent is a combination of isopropanol and methylene chloride.

9. The process of claim 1 wherein the guar gum flour has a particle size of less than 150 microns.

10. The process of claim 1 wherein the guar gum flour has a particle size of less than 110 microns.

11. A process for preparing a particulate product having an increased gelling time in an aqueous suspension, comprising the steps of:
    (a) mixing powdered guar-gum flour with a solution composed of water, an organic compound comprising ethyl cellulose, cellulose acetate phthalate, copolymer of dimethyl amino ethylmethacrylate-neutral methacrylic acid esters or copolymer of acrylic acid-methacrylic acid esters, and solvent for the organic compound wherein the ratio of water to solvent is in the range of from about 60:40 to about 0:100 and the compound is present in an amount of 2–30% by weight of the solution;
    (b) granulating said guar-gum flour with said solution, forming thereby a plurality of agglomerated particles of said guar-gum flour, each said particle having a coating of said solution on an outer surface thereof;
    (c) drying said coated particles to substantially remove water and solvent, thereby forming a coating of said organic compound on said outer surfaces; and
    (d) recovering a particulate product comprising said particles, wherein said product has a particle size in the range of greater than about 0.5 and less than about 3 millimeters.

12. The process of claim 11, wherein said granulating and drying steps result in a coating of said organic compound over said particles sufficient to produce a gelling time greater than about 5 and less than about 30 minutes in a standardized test of 10 g of said particles in 150 ml water at 20° C.

13. The process of claim 12, wherein said gelling time is from about 10 to about 15 minutes.

* * * * *

UNITED STATES PATENT AND TRADEMARK OFFICE
CERTIFICATE OF CORRECTION

PATENT NO. : 4,754,027
DATED : June 28, 1988
INVENTOR(S) : Curt H. Applegren

It is certified that error appears in the above-identified patent and that said Letters Patent is hereby corrected as shown below:

In claim 1, line 40, amend "0.100" to -- 0:100 --.

Signed and Sealed this

Twenty-ninth Day of November, 1988

*Attest:*

DONALD J. QUIGG

*Attesting Officer*     *Commissioner of Patents and Trademarks*